Sept. 18, 1962 R. K. ORTHUBER 3,054,900

SOLID-STATE RADIATION AMPLIFIER

Filed July 6, 1954

3 Sheets-Sheet 1

INVENTOR.
RICHARD K. ORTHUBER

BY George A. Guest

ATTORNEY

Sept. 18, 1962 R. K. ORTHUBER 3,054,900

SOLID-STATE RADIATION AMPLIFIER

Filed July 6, 1954 3 Sheets-Sheet 2

INVENTOR.
RICHARD K. ORTHUBER

BY George A. Gust

ATTORNEY

INVENTOR.
RICHARD K. ORTHUBER
BY
George A. Gust
ATTORNEY 3,054,900

SOLID-STATE RADIATION AMPLIFIER

Richard K. Orthuber, Fort Wayne, Ind., assignor to International Telephone and Telegraph Corporation Filed July 6, 1954, Ser. No. 441,594
19 Claims. (Cl. 250—213)

The present invention relates to a solid-state radiation amplifier and more particularly to an amplifier for reproducing radiation images.

In Orthuber continuation-in-part application Serial No. 332,733, filed January 22, 1953; Ullery application Serial No. 362,204, filed June 17, 1953; and Orthuber et al. application Serial No. 409,982, filed February 12, 1954, different arrangements of a display-amplifying device similar to this invention are disclosed and claimed. This display-amplifying device was embodied in a laminated cell construction in which the laminae, for all practical purposes, were arranged in the manner of an ordinary parallel-plate condenser having a dielectric material interposed between the two plates. The plates of the condenser were composed of electrically conducting material, such as metal, in such thin films as to be transparent. The dielectric was composed of two parts: viz., a lamina of photoconductive material, such as cadmium sulphide, having high dark electrical impedance and a contiguous lamina of electroluminescent material which may be excited to luminescence by the application thereto of a variable electric field. A typical suitable material for this electroluminescent lamina is a copper activated zinc oxide and zinc sulphide mixture as explained by Destriau in the 1937 edition, vol. 38, of Philosophical Magazine, on pages 700–739, 774–793, and 800–887. Other suitable materials are also described in Patents Nos. 2,566,349 and 2,624,857. Since the publication of this Destriau article, considerable developmental efforts have been expended in refining electroluminescent materials for such purposes as illuminating rooms much in the same manner as is accomplished by conventional incandescent lamps. Materials used for lighting may be adapted to this invention in the light of the teachings of the above-mentioned applications and the present following disclosure.

With the application of an exciting alternating voltage to the two plates above-described, a voltage drop may be considered to exist therebetween which is the sum of the two voltage drops occurring across the respective two dielectric layers. By designing these dielectric layers in a predetermined manner, the electroluminescent material may be prevented from luminescing in the absence of exciting light, but, on the other hand, may be caused to luminesce when light energy is projected onto the photoconductive layer. During this latter condition, the electrical characteristics of the photoconductive layer are so changed as to alter the distribution of voltages across the two layers in a direction to increase the magnitude of the voltage applied to the electroluminescent layer. With this increase of voltage, the electroluminescent layer will emit light of such brightness as corresponds to the change in electrical characteristics of the photoconductive layer.

Such an amplifier has particular utility in the reproduction of television and motion picture displays. This cell provides amplification of the image projected upon it, whereby an image of low brightness content produced by a relatively small television picture tube may be magnified many times and reproduced in highly brightened condition for clear observation.

Reproduction characteristics of this amplifier are dependent in part upon the design of the various laminae. Thus, by varying certain structural features, corresponding variations of reproduction characteristics may be achieved.

The invention of the above-mentioned Orthuber application Serial No. 332,733 was of laminated construction composed of flat strata of photoconductive and electroluminescent materials sandwiched between flat transparent film electrodes. As was outlined in the subsequent applications above-mentioned, this laminated construction requires relatively thick photoconductive layers which are difficult to produce by means of currently-known techniques. In order to overcome this difficulty of producing a sufficiently thick photoconductive layer, the above-mentioned subsequent applications utilized thin evaporated films of photoconductive material laid on an irregular supporting surface so as to produce the necessary high impedance in the photoconductive material for controlling the electric field appearing over the electroluminescent layer.

In the above applications carrying the most recent filing dates, the photoconductive material consisted of thin films of evaporated materials, which films are in the order of one micron thickness. During excitation of the phosphor material, it is obvious that the photoconductive film must carry the currents necessary to charge and reverse the charge of the phosphor layer, which electrically behaves like a capacitor. Since the power factor of this "phosphor-capacitor" is rather small, the photoconductor has to control a predominantly wattless current, which provides the power necessary for light emission from the phosphor in a rather inefficient way.

In view of this inefficiency as well as other reasons, it is an object of this invention to provide a radiation amplifier wherein the photoconductive material does not carry the high exciting currents for the phosphor material.

It is another object of this invention to provide a radiation amplifier in which the photoconductive material serves to control a variable bias voltage which in turn controls an exciting alternating field applied to the phosphor.

It is still another object of this invention to provide a radiation amplifier which utilizes a bias-sensitive material in combination with the phosphor material, which serves to control an exciting alternating field over the phosphor material in response to a change in a biasing potential applied to the bias-sensitive material.

In accordance with the present invention, there is provided a radiation amplifier comprising phosphor means which luminesces in response to an exciting alternating field, photoconductive means for controlling the level of said exciting field or varying the luminescence of said phosphor means, and means intercoupling said phosphor and said photoconductive means in a manner that the phosphor-exciting electric field is isolated from said photoconductive means but the latter is capable of controlling the aforesaid exciting field level.

For a better understanding of the invention, together with other and further objects, reference is made to the following description taken in connection with the accompanying drawings, the scope of the invention being defined by the appended claims.

Figure 1:
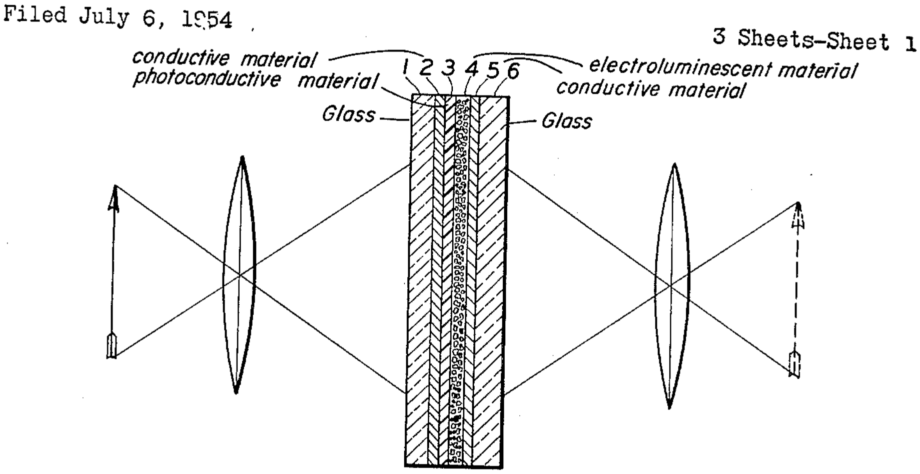
FIG. 1 is a cross-sectional view in diagrammatic form of one embodiment of this invention and the inventions disclosed in the aforementioned copending applications.

Referring to FIG. 1 in the drawings, the display amplifier is comprised of a laminated assembly of planar construction and is of suitable configuration such as circular or square in plan view. The laminations of this assembly comprise a glass or the like supporting plate 1, a transparent film of conductive material 2, such as evaporated silver or stannous chloride applied to one side of the plate 1, a layer 3 of photoconductive material (cadmium sulphide, for example), a layer of electroluminescent material 4 contiguous with the layer 3, another film 5 of conductive material which may be identical with the material of film 2, and a second supporting glass plate 6 which carries the film 5. A light-attenuating insulation lamina (not shown) may be interposed between the layers 3 and 4 for limiting light-feedback between these layers.

Figures 2, 4:
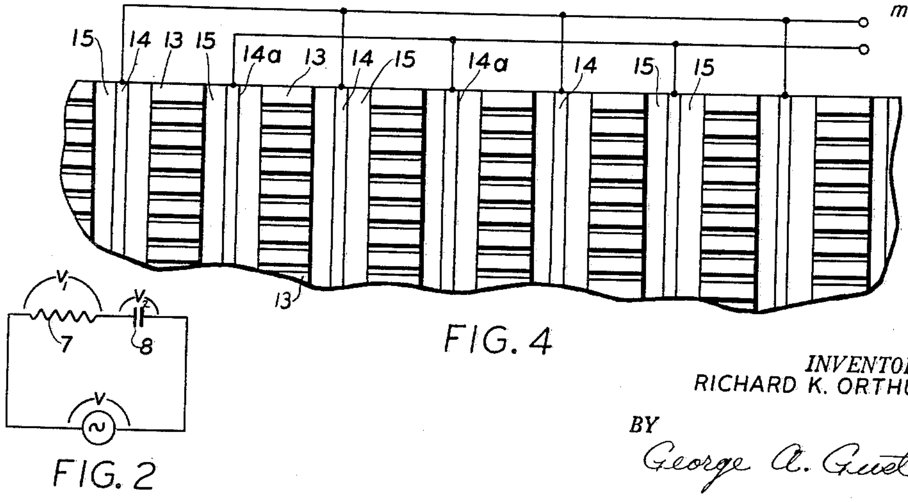
FIG. 2 is an equivalent circuit diagram used in explaining the operation of the embodiment of FIG. 1.
FIG. 4 is a similar sectional view taken on section line 4—4 of FIG. 3.

The equivalent electrical circuit of this assembly is represented by FIG. 2. The resistor, generally indicated by reference numeral 7, is comprised of the film electrode 2 and the photoconductive material 3, and the condenser, generally indicated by the reference numeral 8, is comprised of the electroluminescent layer 4 (the dielectric) and the film electrode 5. By application of an alternating exciting voltage of, for example, 600 volts at 800 cycles, across the two electrodes 2 and 5 as shown, a certain distribution of voltages or voltage division will occur over the two components 7 and 8, since they are connected in series. At first, if it is assumed that the components 7 and 8 are subjected to a condition of "no light" (in other words, placed in a completely darkened room), a certain voltage division will be obtained as indicated by the symbols V1 and V2, respectively. The sum of these voltages V1 and V2 equals the applied voltage "V." Now, if it is assumed that the photoconductive material of the resistor 7 is illuminated, the impedance characteristics of this material will correspondingly change, thereby altering this division of voltages. Since illumination tends to lower the impedance of the photoconductive material 3, an increase of voltage will be applied to the layer 4. This layer 4 (condenser 8) thereupon luminesces with a brightness dependent upon the magnitude of the alternating voltage (V2) applied thereto, so it becomes apparent that as the impedance of the component 7 decreases, the electroluminescent material 4 tends to luminesce. It is important that the photoconductive layer 3 possesses a relatively low capacity. Similarly, the dark-resistance of this layer 3 should be high. With the impedance properly designed, the division fo voltages across the two components 7 and 8 will be such to impose substantially all of the voltage across resistor 7 and a very small voltage across the condenser 8 during "no light" conditions. By assuring that this latter voltage is sufficiently small, the electroluminescent lamina 4 will not luminesce. Now, assuming the condition of projecting incident light on the layer 3 of progressively increasing brightness, the impedance across the layer 3 wll correspondingly decrease thereby altering the division of voltages across the components 7 and 8 in a direction to increase the voltage across the electroluminescent material 4. When the threshold of luminescent sensitivity is reached, the lamina 4 will luminesce to a degree dependent upon the magnitude of the voltage impressed thereover.

Referring now in particular to FIGS, 3, 4 and 5, like numerals will indicate like parts. The reinforcing member 1 is preferably a transparent flat glass plate having opposite parallel surfaces 9 and 10. The surface 10 is formed with a plurality of equispaced, parallel V-shaped grooves 11. These grooves 11 are spaced apart a distance to provide a base surface 12 upon which are deposited a plurality of elemental contacts 13 (FIG. 4). These contacts 13 are distributed along the length of the respective base surfaces 12 and are mutually insulated for a purpose which will become apparent from the following. The size of these elements 13 is a matter of design preference and will depend upon the size of the overall amplifier as it is illustrated in FIG. 1.

Terminal strips or electrodes 14 and 14*a* are supported in the apices of the grooves 11 and may comprise thin strips of metal.

In conductive contact with each strip 14, 14*a* and on the surfaces of the various grooves 11 is an evaporated layer 15 of photoconductive material such as cadmium sulphide. This layer or film is of such thickness as will produce the desired operating characteristics, which may range from between about one to twenty microns. This film is formed by any suitable method, such as by evaporation according to the method given by R. E. Aitchison in Nature Magazine, vol. 167, page 812. As is more clearly shown in FIG. 3, the film 15 extends from the respectively electrode strip 14, 14*a* to the edges of the adjacent contact elements 13. A photoconductive connection is thus produced between the metal strips 14, 14*a* and the respective contact elements 13.

Figure 5:
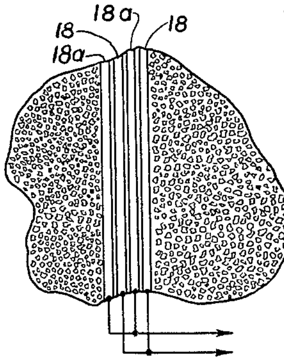
FIG. 5 is an enlarged fragmental sectional view taken substantially on section line 5—5 of FIG. 3.

Contiguous with the contact elements 13 is a layer 16 of electroluminescent phosphor material of a thickness of 1-mil, for example. Superimposed on this layer 16 is another glass plate 17 which carries a plurality of terminal strips 18, 18*a* which are mutually insulated from each other and which extend underneath and substantially parallel to the base surfaces 12 of the glass plate 1. The arrangement of these strip electrodes 18, 18*a* is more clearly seen in FIG. 5. With reference to the spacing between these strips 18, 18*a*, it is important that enough space be maintained as to prevent the phosphor layer 16 from luminescing therebetween when an exciting alternating field is applied thereto. While this requirement will become more apparent from the following description, it is desirable that the spacing between the strips 18, 18*a* be from two to ten times the thickness dimension of the layer 16.

The strip electrodes 14, 14*a* of the plate 1 are grouped in pairs, with all strips 14 being conductively connected together and all strips 14*a* being conductively connected together. Thus, the alternating strips 14 have a common connecting line 19 while the alternate strips 14*a* have a common line 20. These lines 19 and 20 are coupled to a source of D.C. potential consisting of the two batteries 21 and 22 of equal potential which are grounded as shown. The upper line 20 is positive with respect to the lower line 19.

The terminal strips 18, 18*a* on the glass plate 17 are similarly grouped into pairs with alternate strips 18 being connected to a line 23 and the other alternate strips 18*a* being connected to line 24. A suitable source of alternating exciting potential is coupled across these two lines 23 and 24 by means of a transformer 25 having a center tap 26 grounded as shown.

The impedance of the photoconductive film 15 in the various grooves 11 is such that the intervening segments 13 are substantially at ground potential, under "no light" conditions as will be explained more fully in the following.

Briefly explaining the operation of the invention thus far covered, assume that only the photoconductive films in the grooves containing the strips 14*a* are covered with exciting radiation. Since the impedance of the film 15 lowers where illuminated, the potential on the adjacent contact elements 13 will shift positively, whereupon the exciting field in the electroluminescent layer 16 is made assymetric with respect to ground and can be considered as composed of a D.C. (or slowly variable field) and the superimposed phosphor-exciting A.C. field applied between the strip systems 18 and 18*a*. It will be shown later how it is possible to vary the light output of the phosphor layer 16 by varying the D.C. (or slowly variable) bias field even if the exciting A.C. field is constant.

Figure 6:
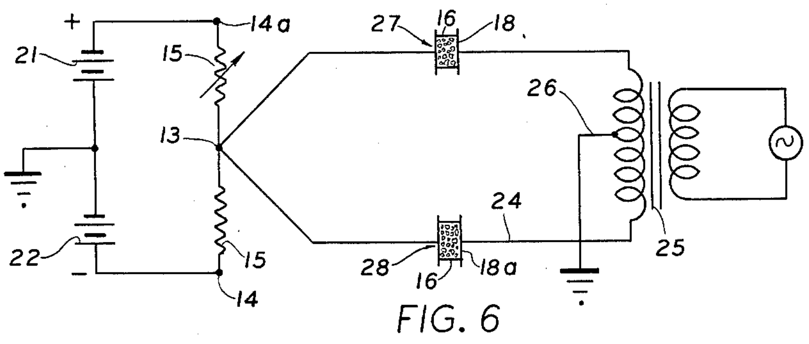
FIGS. 6, 7 and 8 are circuit diagrams of different embodiments of this invention used in explaining the operation thereof.

The exact method of operation is best understood by reference to the circuit diagram of FIG. 6 wherein like numerals indicate like parts. Only a single contact element 13 is considered in this diagram as well as single strips 18 and 18*a*. It is seen that two loop circuits are provided having a common connecting point 13, the loop to the left of the point 13 including the two impedance films 15 which are diagrammatically represented as resistors and the two batteries 21 and 22. The loop on the right-hand side of the point 13 includes the transformer 25 which is coupled across the strip electrodes 18 and 18*a*. The electroluminescent material 16 is interposed between these two electrodes 18 and 18*a* and the respective contact terminal 13. Since the material 16 is contained between the contact element 13 and the strip electrodes 18, 18*a*, the equivalent electrical circuit may be symbolized by the resulting capacitances 27 and 28.

Since illumination of one of the films 15 connected to a particular strip 14*a* causes the impedance of the film to vary, this action is symbolized in the diagram of FIG. 6 by making one of the resistors 15 variable.

As will now appear, the circuit loop to the left of the point 13 primarily carries D.C. voltage and is completely isolated from the transformer 25 such that no A.C. current passes through the two resistors 15. This left-hand loop serves to determine the potential of the point 13, and is therefore termed a "bias" loop. By using batteries 21 and 22 of equal potential and setting the two resistors 15 at equal values, the D.C. potential on point 13 will be zero or ground potential. By varying the resistance of one resistor 15 (such as projecting light on one of the grooves 11 containing a strip 14*a*) the point 13 is thereby shifted from its ground potential and assumes a charge depending upon the direction of change in the resistance. From the previous example, by lowering the resistance, the point 13 is made more positive.

Considering now the loop to the right of the point 13, which is termed a "power loop," since the point 26 on the transformer 25 is symmetrical with respect to the two condensers 27 and 28, it will obviously appear that the point 13 will normally be at the same potential as ground.

Considering first that there is no radiation projected onto the photoconductive elements 15, the point 13 will be at ground potential, the same as point 26 and the intermediate tap of the two batteries 21 and 22. The center tap 26 of the transformer 25 between the two condensers 27 and 28 being at the same potential as the point 13, the potential at point 13 will be zero. The voltages appearing across the two condensers 27 and 28 will therefore be equal and symmetric to ground potential.

If now one of the resistors 15 is illuminated, its resistivity will decrease and the potential at point 13 shifts positively with respect to ground. This shift in potential of the point 13 may be considered as being superimposed upon the alternating current voltage applied to the two condensers 27 and 28, which in turn causes the dielectric material of the latter to change in luminescence correspondingly.

The important difference in operation between this embodiment of FIG. 6 and that of the previous embodiment illustrated in FIG. 2 is that the alternating phosphor-exciting currents are completely isolated from the photoconductive films such that the latter do not have to carry appreciable currents.

Figure 3:
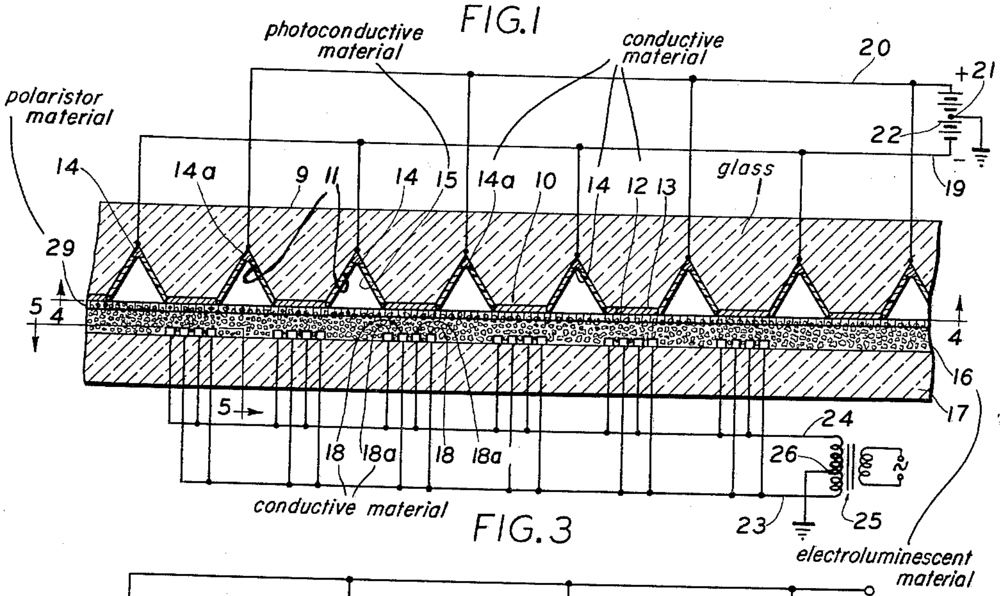
FIG. 3 is an enlarged fragmental cross-section of a specific embodiment of the invention in this application.

Considering a slightly different embodiment of the invention as diagrammatically shown in FIG. 6, reference is made to FIG. 3 wherein a stratum of polaristor material 29 is shown interposed between the phosphor stratum and the contact elements 13. It has been found from experiments that certain known electroluminescent materials do not adequately respond to change in brightness by the super-position of a D.C. voltage on an A.C. exciting field. In order to achieve control of phosphor luminescence by photoconductor illumination in the device of FIG. 6, it is necessary that the phosphor material 16 have a luminescing characteristic which depends on frequency and amplitude of the applied alternating voltage as well as the level of D.C. bias voltage which is superimposed thereon.

In order to make more effective use of known phosphors, the layer 29 of polaristor material (FIG. 3) is used as explained previously.

Polaristor material suitable for this purpose is described by H. E. Hollmann, Proceedings I.R.E., vol. 40, (1952), pages 537–545. Briefly, polaristors originally consisted of colloidal suspensions of conductive particles in oil (H. E. Hollmann, Journal of Applied Physics, vol. 21, pages 402–413, May 1950). It was found that under the influence of a polarizing field, the conductive particles orient such that conducting chains are formed within the insulating fluid. By increasing this polarizing field, the number of conducting paths and the contact pressure between particles increases, thus leading to a rapidly decreasing resistance of the colloidal suspension. Current through the suspension therefore increases at a greater rate than proportional to the voltage applied thereto.

In a later publication (H. E. Hollmann, Proceedings I.R.E., vol. 40, pages 538–545, May 1952) it is described that such suspension in a liquid may be replaced by imbedding conductive or semi-conductive particles in a plastic layer if the hardening of the plastic is performed in the presence of a strong polarizing electric field. Polaristor layers of this type have an alternating current conductance which is strongly dependent on a superimposed D.C. biasing field. The layer 29 is the same as the polaristor layer just described. Suitable conductive particles which may be used in the layer are titanium dioxide with a reduced oxygen content. Suitable plastic carriers include polystyrene, methyl-methacrylate, urea-formaldehyde, etc. In order to achieve the best polaristor action, the hardening of the plastics should take place in a relatively strong electric polarizing field. The relative positions of the phosphor layer 16 and the polaristor layer 29 may be reversed without impairing the operation to be described hereinafter.

Figure 7:
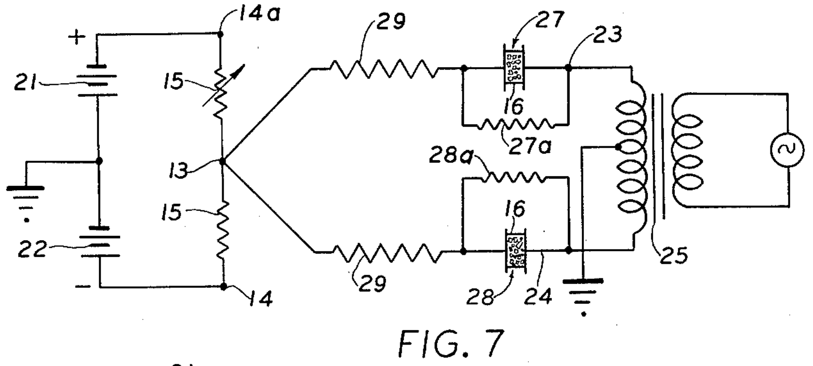

FIG. 7 is a circuit diagram illustrating the use of the polaristor layer 29. As in the case of FIG. 6, this diagram symbolizes one of many independent elements of the complete amplifier. The principal difference between the diagrams of FIGS. 6 and 7 is the presence of the two resistances 29 which are in series with the two condensers 27 and 28. If one of the resistors 15 is illuminated as previously described, the potential on the point 13 will shift positively. Consequently, in addition to the A.C. potential normally appearing across the polaristor elements 29 from the transformer 25, a D.C. or slowly varying bias field determined by the resistance 29 and the leak-resistances 27*a* and 28*a* is superimposed on this A.C. potential which causes the resistance of each of the elements 29 to decrease. Such a decrease in resistance across the individual resistors 29 leaves a larger fraction of the total A.C. voltage developed across the lines 23 and 24 to appear across the two condensers 27 and 28. Since this condenser voltage increases, the phosphor material of the condensers will luminesce with greater brightness.

Figure 8:
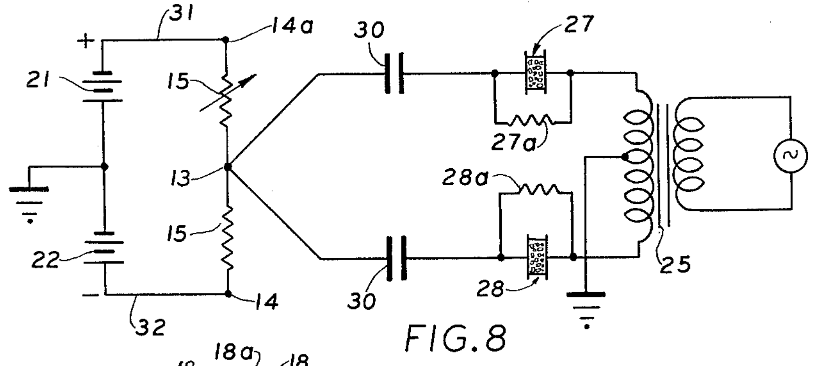

Reference to a still further embodiment of this invention is diagrammatically illustrated in FIG. 8. The same operational division of voltages as explained in FIG. 7 can be obtained by substituting condensers having variable capacities for the two polaristors 29 (FIG. 7). These condensers are indicated by the reference numerals 30 which in the physical embodiment of FIG. 3 correspond to the layer 29. This layer 29 is, however, made of "ferro electric" material having the property of decreasing capacity with increasing bias-field. The phenomenon of ferro electric materials is described by A. M. Vincent in Electronics, vol. 24, December 1951, pages 84–88. Other descriptions are found by Abraham Silverstein, Electronics, vol. 27, February 1954, pages 150–153, and in the Bulletin of the American Physical Society, vol. 29, No. 5, June 28, 1954, page 8, paper A5. Still further information on these ferro electric materials suitable for this invention is given by George S. Shaw and James L. Jenkins, Electronics, vol. 26, October 1953, pages 166–167.

With reference to the operation of this embodiment of FIG. 8, it is convenient to consider in comparison the operation of the preceding embodiment of FIG. 7. The difference in performance of an amplifier utilizing a ferro-electric layer 30 (FIG. 8) instead of a polaristor layer is explained in the following.

In the embodiment of FIG. 7, with no illumination on the photoconductive resistor 15, the power loop 25, 27, 13, 28 is unbiased. With a polaristor element 29 in the power loop, the resistance thereof is a maximum. The voltages over the respective condensers 27 and 28 are consequently a minimum and the luminescence of the phosphor material 16 is a minimum. Therefore, illumination increase produces an increase in phosphor brightness. The resulting reproduced image is a positive replica of the illuminating-input image. If the polaristor element 29 is replaced by a ferro-electric layer (capacitors 30 in FIG. 8) under conditions of no exciting illumination, the power loop will have no bias applied thereto. In this case, the respective capacities of the two condensers 30 are a maximum, whereupon maximum voltage is applied to the two phosphor condensers 27 and 28.

Illumination of the variable photoconductive resistor 15 produces a bias voltage across the ferro-electric condensers 30, causing the latter to decrease in capacitance (or conversely to increase the reactance). This in turn causes the voltage across the two phosphor condensers 27 and 28 to reduce, whereupon the phosphor luminescence diminishes. Therefore, by substituting ferro-electric material in place of the polaristor material, the reproduced image becomes a negative reproduction of the illuminating-input image.

The relationship between amplifier input and output images may be reversed, however, by changing the D.C. voltages applied to the terminals 31 and 32 of the biasing loop. In the case of the embodiment FIG. 8 this is done in such a manner that under "no light" condition the voltages over the two resistors 15 are no longer symmetrical with respect to ground potential. For example, plus 200 volts may be applied to terminal 31 and minus 800 volts to terminal 32. Thus with no illumination on the bias loop, the power loop is negatively biased with respect to ground, which reduces the phosphor excitation voltage on the two condensers 27 and 28 to a minimum. Illumination of the variable photo-resistor 15 now will reduce this negative bias potential at the point 13. Sufficient illumination will reduce the potential of this point 13 to that of ground potential. In such case, excitation of the phosphor condensers 27 and 28 will be a maximum. The reproduction of a positive image therefore results.

Figure 9:
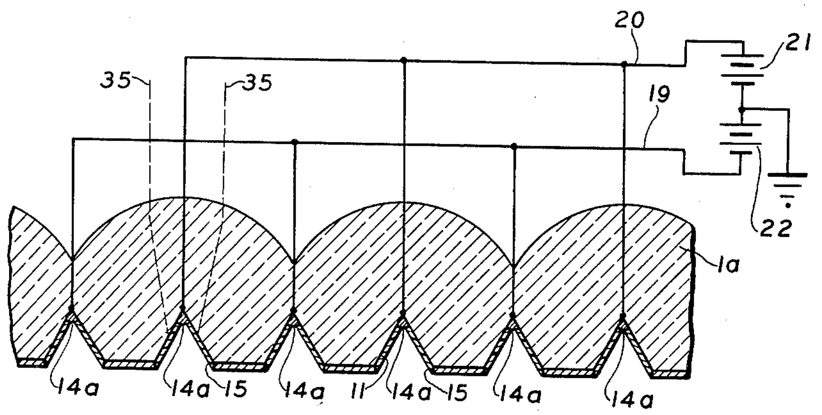
FIG. 9 is an enlarged fragmental cross-section of a different construction for one of the sub-assemblies used in the embodiment of FIG. 3.

It has been repeatedly explained in the foregoing that only one of the resistors 15 of the embodiments illustrated in FIGS. 6, 7 and 8 is altered by illumination in order to shift the bias of the point 13. In order to insure that only the variable resistor 15 is changed, it is necessary that the incident light be concentrated into only alternate grooves 11 of the supporting plate 1 (FIG. 3). Stated in other words, only the grooves carrying strips 14*a* should receive illumination, the grooves with the strips 14 remaining dark. This condition of operation is achieved by using a reinforcing plate 1*a* (FIG. 9) composed of parallel cylindrical lenses. These lenses are oriented parallel to the grooves 11. The width of these lenses is made twice the distance between grooves 11. The lenses are registered with the groves such that the apex of each lens is directly above the apex of each alternate groove carrying the strip 14*a*. The curvature of the cylindrical surfaces and the spacing from the groove 11 apices shall be such that parallel light falling on the lenses, as indicated by the dashed line rays 35, shall be converged and concentrated onto the photoconductive layer associated with the groove 11 containing the strip 14*a*. Conversely, the intervening grooves containing the strips 14 receive no light and the conductivity of the photoconductive films thereof is made independent of incident illumination.

While several different embodiments of this invention have been disclosed in the foregoing disclosure for varying the bias level in a circuit containing the phosphor material 16, it will appear obvious to those skilled in the art that many other arrangements are possible without departing from the scope of this invention. For example, the arrangement of FIG. 3 may be altered by eliminating the glass plate 1, the terminal strips 14, 14*a* and the photoconductive film 15, leaving the remainder of the structure which includes the contact elements 13. This resulting sub-assembly may be incorporated in the front end of an ordinary cathode ray tube with the elements 13 exposed to electron bombardment. By suitable selection of the material for these contact elements 13, the impinging electron stream may be utilized to establish a bias thereon. The material may have a secondary emission ratio greater than unity, whereupon electron bombardment of an individual element 13 would produce a positive charge or bias thereon.

While there has been described what is at present considered the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A solid-state radiation-amplifying device comprising first means which luminesces in response to an exciting electric field of predetermined character, second means for controlling the exciting field which is applied to said first means for varying the luminescence of said first means, and third means intercoupling said first and second means in a manner that the electric field which is applied to said first means is substantially isolated from said second means but said second means controls said field.

2. A solid-state radiation-amplifying device comprising first means which luminesces in response to an exciting electric field of predetermined character, radiation-sensitive means for controlling said electric field for varying the luminescence of said first means, excitation of said radiation-sensitive means causing the latter to produce a biasing potential superimposed on said electric field, and means intercoupling said first means and said radiation-sensitive means, said intercoupling means applying said electric field onto said first means but not onto said radiation-sensitive means, said intercoupling means further superimposing said biasing potential onto said electric field.

3. A solid-state radiation-amplifying device comprising a layer of composite phosphor which luminesces in response to an exciting alternating electric field of predetermined magnitude, electrode means for applying said exciting field over said layer, and a biasing-potential stratum contiguous with said phosphor material layer, said electrode means being operatively coupled to said biasing stratum such that said electric field will not be applied over said biasing stratum, said electrode means further coupling said biasing potential to said phosphor layer such that the level of said electric field may be controlled by said biasing potential.

4. A solid-state radiation-amplifying device comprising a layer of electroluminescent material, a plurality of mutually insulated first electrode terminals on one surface of said layer, a plurality of mutually insulated contact elements on the other surface of said layer, said first terminals being grouped into pairs, a source of alternating current potential coupled across each pair, said source being symmetrically grounded with respect to the respective terminals of each pair, photoconductive material disposed in conductive engagement with said contact elements, and a plurality of mutually separated second electrode terminals contacting said photoconductive material intermediate said contact elements respectively, said second terminals being grouped into pairs, a source of direct current potential coupled across each pair of second terminals thereby establishing an impedance path extending from each second terminal, through the adjacent photoconductive material to the adjacent contact element, through the opposite adjacent photoconductive material and to the other second terminal which is paired with said each second terminal, said direct current source being symmetrically grounded with respect to the respective second terminals of each pair, said impedance path being so arranged as to place said contact elements at ground potential when no radiation is projected onto said photoconductive material, said impedance path further being so arranged that when said photoconductive material is excited by radiation the potential on said contact elements will be shifted from said ground potential whereby the alternating electric field between each pair of first terminals and the respective contact elements will change to produce a corresponding change in the excitation of said stratum.

5. A solid-state radiation-amplifying device comprising a reinforcing member, a plurality of elemental electrode terminals on said member which are mutually insulated, alternate ones of said terminals being conductively connected together, a source of alternating current potential coupled to said alternate terminals, said source being grounded to a reference potential symmetrically with respect to said alternate contacts; a layer of electroluminescent material disposed over said terminals in conductive engagement therewith; a plurality of elemental contacts spaced apart and disposed on said layer on the side opposite said terminals; and a second reinforcing member contiguous with said contacts and having a plurality of spaced parallel grooves, said contacts lying on opposite sides of said grooves and being mutually insulated from each other in the direction of said grooves, a film of photoconductive material disposed on the surfaces of said grooves and extending into conductive engagement with the adjacent contacts, a plurality of strip electrodes disposed in the bottom of said grooves respectively, alternate ones of said strip electrodes being connected together, a source of direct current potential, said direct current source being connected between alternate ones of said strip electrodes and also being connected to said ground potential symmetrically with respect to said alternate strip electrodes to place said elemental contacts at said ground potential when no radiation is projected onto said photoconductive material, all of said potentials and said connections being arranged such that radiation on predetermined areas of said photoconductive material will serve to alter the potential on the respective adjacent elemental contacts to change the alternating electric field over the corresponding portions of said layer for causing the latter to luminesce.

6. A solid-state radiation-amplifying device comprising a layer of electroluminescent phosphor, which luminesces in response to an exciting alternating current electric field of predetermined magnitude, electrode means for applying said exciting field over said layer, and a biasing potential stratum contiguous with said phosphor material stratum and operative to superimpose a biasing potential onto said electric field for changing the level of the latter, said electrode means being operatively coupled to said biasing stratum such that said electric field will not be applied over said biasing stratum but will be applied over said phosphor layer only, said electrode means further coupling said biasing potential to said phosphor layer such that the level of said electric field may be controlled by said biasing potential.

7. A solid-state radiation-amplifying device comprising a stratum of electroluminescent and ferro-electric material, a plurality of mutually insulated first electrode terminals on one surface of said stratum, a plurality of mutually insulated contact elements on the other surface of said stratum, said first terminals being grouped into pairs, a source of alternating current potential coupled across each pair, said source being symmetrically grounded with respect to the respective terminals of each pair, photoconductive material disposed in conductive engagement with said contact elements, and a plurality of mutually separated second electrode terminals contacting said photoconductive material intermediate said contact elements respectively, said second terminals being grouped into pairs, a source of direct current potential coupled across each pair of second terminals thereby establishing an impedance path extending from each second terminal, through the adjacent photoconductive material to the adjacent contact element, through the opposite adjacent photoconductive material and to the other second terminal which is paired with said each second terminal, said direct current source being symmetrically grounded with respect to the respective second terminals of each pair, said impedance path being so arranged as to place said contact elements at ground potential when no radiation is projected onto said photoconductive material, said impedance path further being so arranged that when said photoconductive material is excited by radiation the potential on said contact elements will be shifted from said ground potential whereby the alternating electric field between each pair of first terminals and the respective contact elements will change to produce a corresponding change in the excitation of said stratum.

8. A solid-state radiation-amplifying device comprising a stratum of electroluminescent and polaristor material, a plurality of mutually insulated first electrode terminals on one surface of said stratum, a plurality of mutually insulated contact elements on the other surface of said stratum, said first terminals being grouped into pairs, a source of alternating current potential coupled across each pair, said source being symmetrically grounded with respect to the respective terminals of each pair, photoconductive material disposed in conductive engagement with said contact elements, and a plurality of mutually separated second electrode terminals contacting said photoconductive material intermediate said contact elements respectively, said second terminals being grouped into pairs, a source of direct current potential coupled across each pair of second terminals thereby establishing an impedance path extending from each second terminal, through the adjacent photoconductive material to the adjacent contact element, through the opposite adjacent photoconductive material and to the other second terminal which is paired with said each second terminal, said direct current source being symmetrically grounded with respect to the respective second terminals of each pair, said impedance path being so arranged as to place said contact elements at ground potential when no radiation is projected onto said photoconductive material, said impedance path further being so arranged that when said photoconductive material is excited by radiation the potential on said contact elements will be shifted from said ground potential whereby the alternating electric field between each pair of first terminals and the respective contact elements will change to produce a corresponding change in the excitation of said stratum.

9. A solid state radiation amplifying device comprising an electroluminescent body, a first source of electrical potential operatively coupled to said body for applying thereto an electric field insufficient to cause said body to luminesce, a second source of electrical potential operatively coupled to said body for adding to said electric field sufficient strength to cause said body to luminesce, and radiation responsive means for controlling the amount of strength added to said electric field by said second source.

10. A radiation amplifier comprising an electroluminescent body, a first source of voltage connected in parallel with said body, a second source of voltage operatively connected in series with said body, and radiation responsive means for controlling one of said sources.

11. A solid-state radiation-amplifying device comprising a source of an exciting variable potential field, first means which luminesces in response to said source, second means of the photoconductive type for controlling the effect of said exciting field of said source for varying the luminescence of said first means, and third means interconnecting said first and second means for preventing said exciting field from being applied to said second means but for providing the necessary coupling between said first and second means for varying the luminescence of said first means.

12. A solid-state radiation-amplifying device comprising electroluminescent phosphor means which luminesces in response to an exciting variable electric field, radiation-sensitive means having an impedance which varies in response to varying radiant energy, first circuit means for applying a variable electric field to said electroluminescent phosphor means, and second circuit means operatively coupled to said radiation-sensitive means for applying a biasing potential thereto, said first and second means being interconnected for superposing the biasing potential on the electric field which is applied to said electroluminescent phosphor means.

13. A solid-state radiation-amplifying device comprising a layer of electroluminescent phosphor material, a body of radiation-sensitive material having impedance characteristics which vary in response to incident radiation, said body being in two parts which are connected in series, the junction of the series connection between said two parts being operatively coupled to said phosphor layer, first means for applying a variable electric field to said phosphor layer, and second means for applying a biasing potential in series with said radiation-sensitive body.

14. A solid-state radiation-amplifying device comprising a layer of electroluminescent phosphor material, a body of radiation-sensitive material having impedance characteristics which vary in response to incident radiation, said body being in two parts which are connected in series, the junction of the series connection between said two parts being operatively coupled to said phosphor layer, first means for applying a variable electric field to said phosphor layer, second means for applying a biasing potential in series with said radiation-sensitive body, and third means for applying a common reference potential to both said first and second means.

15. A solid-state radiation-amplifying device comprising a layer of electroluminescent phosphor material, biasing potential means operatively coupled to said layer for applying a biasing potential thereto, and electrode means for applying a variable electrical field to said layer.

16. A solid-state radiation-amplifying device comprising a layer of electroluminescent phosphor material, biasing potential means operatively coupled to said layer for applying a biasing potential thereto, radiation-sensitive means for controlling said biasing potential means whereby the amplitude of the biasing potential applied to said layer may be varied, and electrode means for applying a variable electrical field to said layer.

17. A solid-state radiation-amplifying device comprising a layer of electroluminescent phosphor material, a body of radiation-sensitive material having impedance characteristics which vary in response to incident radiation, an impedance connected in series with said body, the junction between the series connected impedance and body being operatively coupled to said phosphor layer, first means for applying a variable electric field to said phosphor layer, and second means for applying a biasing potential in series with said radiation-sensitive body.

18. A solid-state radiation-amplifying device comprising a layer of composite phosphor which luminesces in response to an exciting alternating electric field of predetermined magnitude, electrode means for applying said exciting field over said layer, and a biasing-potential stratum operatively coupled to said phosphor material layer, said electrode means being operatively coupled to said biasing stratum such that said electric field will not be applied over said biasing stratum, said electrode means further coupling said biasing potential to said phosphor layer such that the level of said electric field may be controlled by said biasing potential.

19. An electroluminescent image device comprising an array of spaced apart elongated conductors arranged side by side, adjacent ones of said conductors being electrically insulated from each other, electroluminescent phosphor material on each of said conductors on the same side of said array, a mosaic of mutually insulated conductive elements adjacent to said phosphor material, each of said conductive elements being registered with a conductor to form an electroluminescent cell with the phosphor therebetween, photoconductive material on said mosaic and contacting each of said conductive elements and bridging the gaps therebetween, and lead means connected to said conductors for applying a potential difference between adjacent conductors.

References Cited in the file of this patent

UNITED STATES PATENTS

| | | |
|---|---|---|
| 2,594,740 | De Forest et al. | Apr. 29, 1952 |
| 2,645,721 | Williams | July 14, 1953 |
| 2,650,310 | White | Aug. 25, 1953 |
| 2,692,948 | Lion | Oct. 26, 1954 |

OTHER REFERENCES

Marshall et al.: Quarterly Rev. #3, Fellowship on Computer Components #347, Inst. of Industrial Research, 1951.